United States Patent Office 2,711,642
Patented June 28, 1955

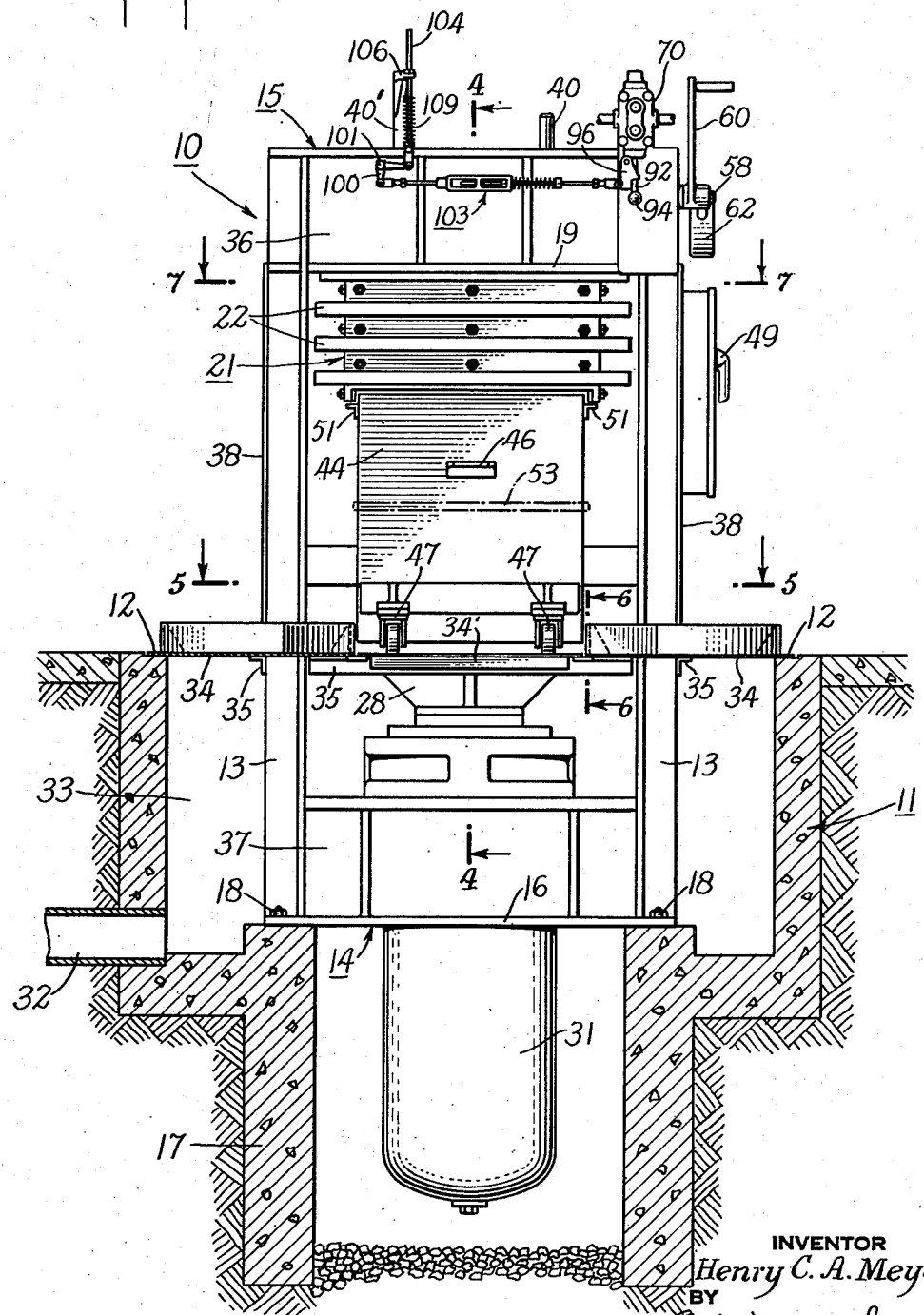

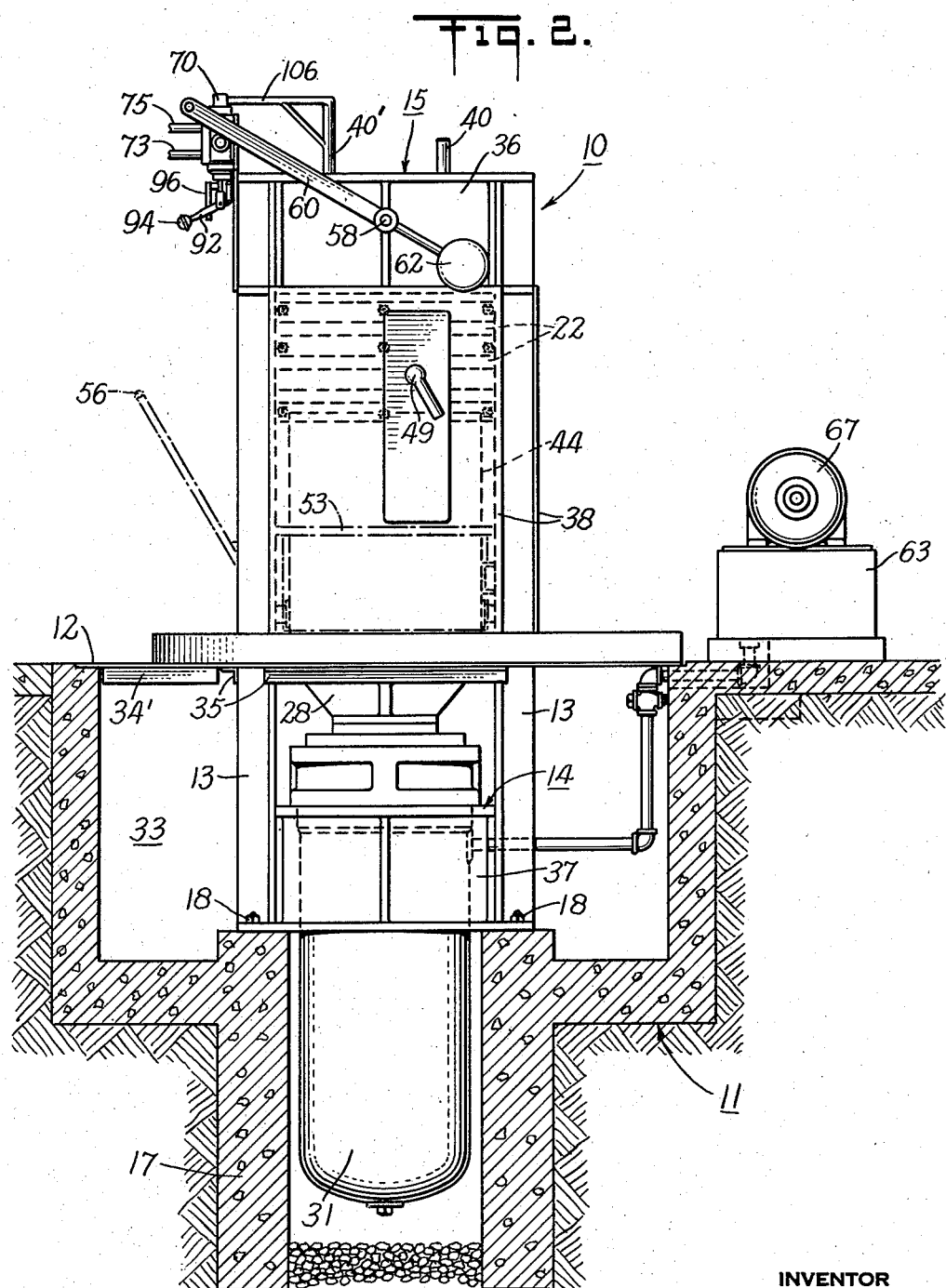

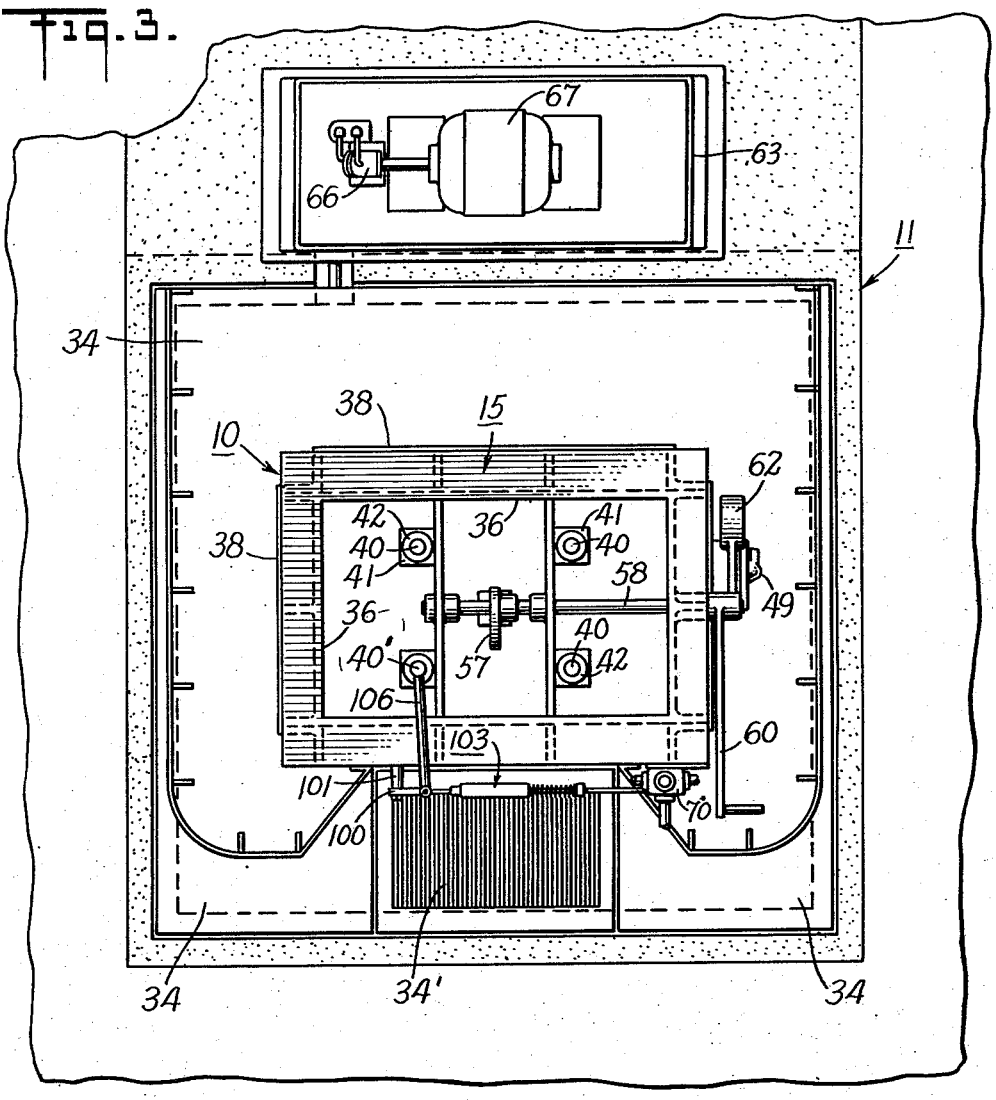

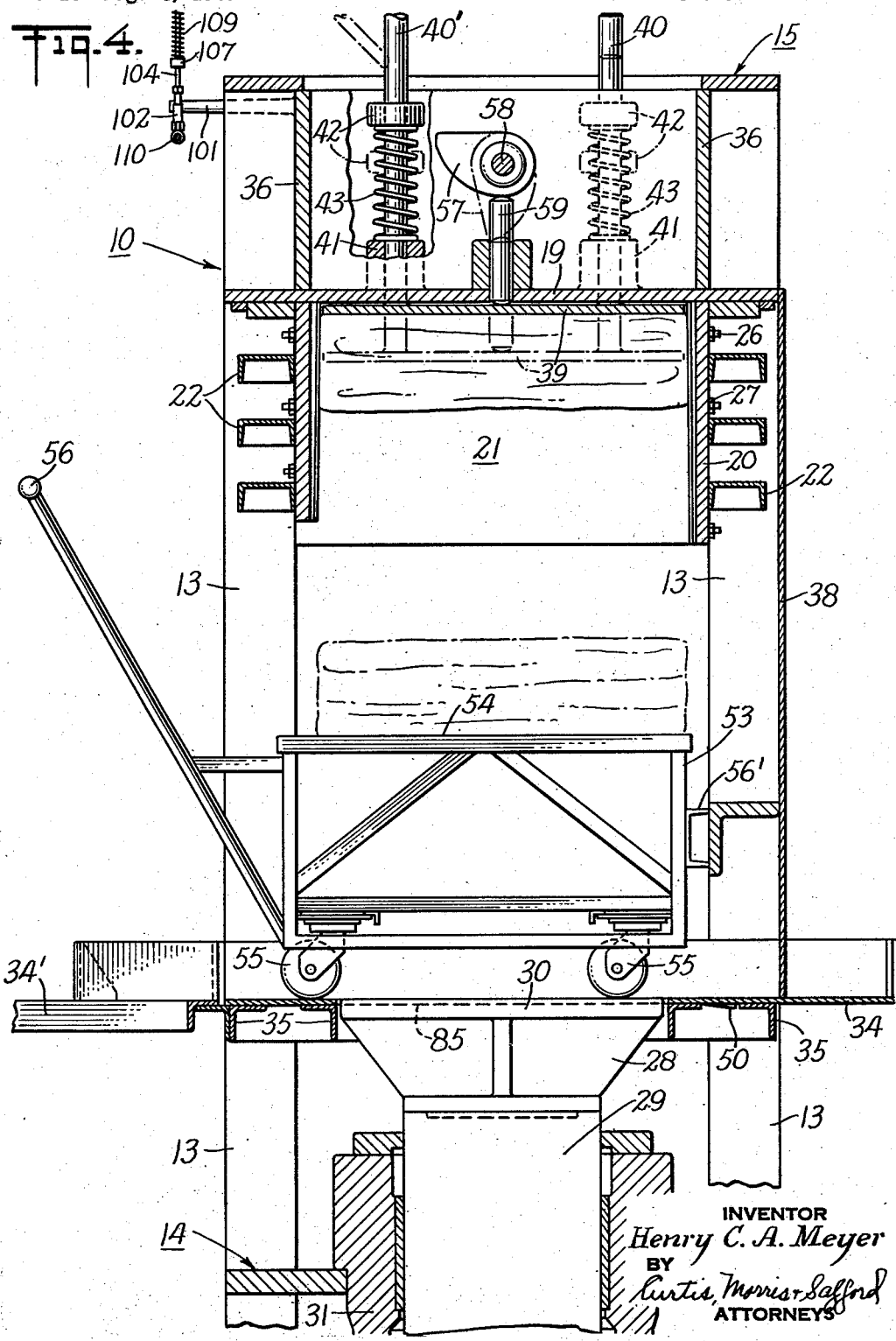

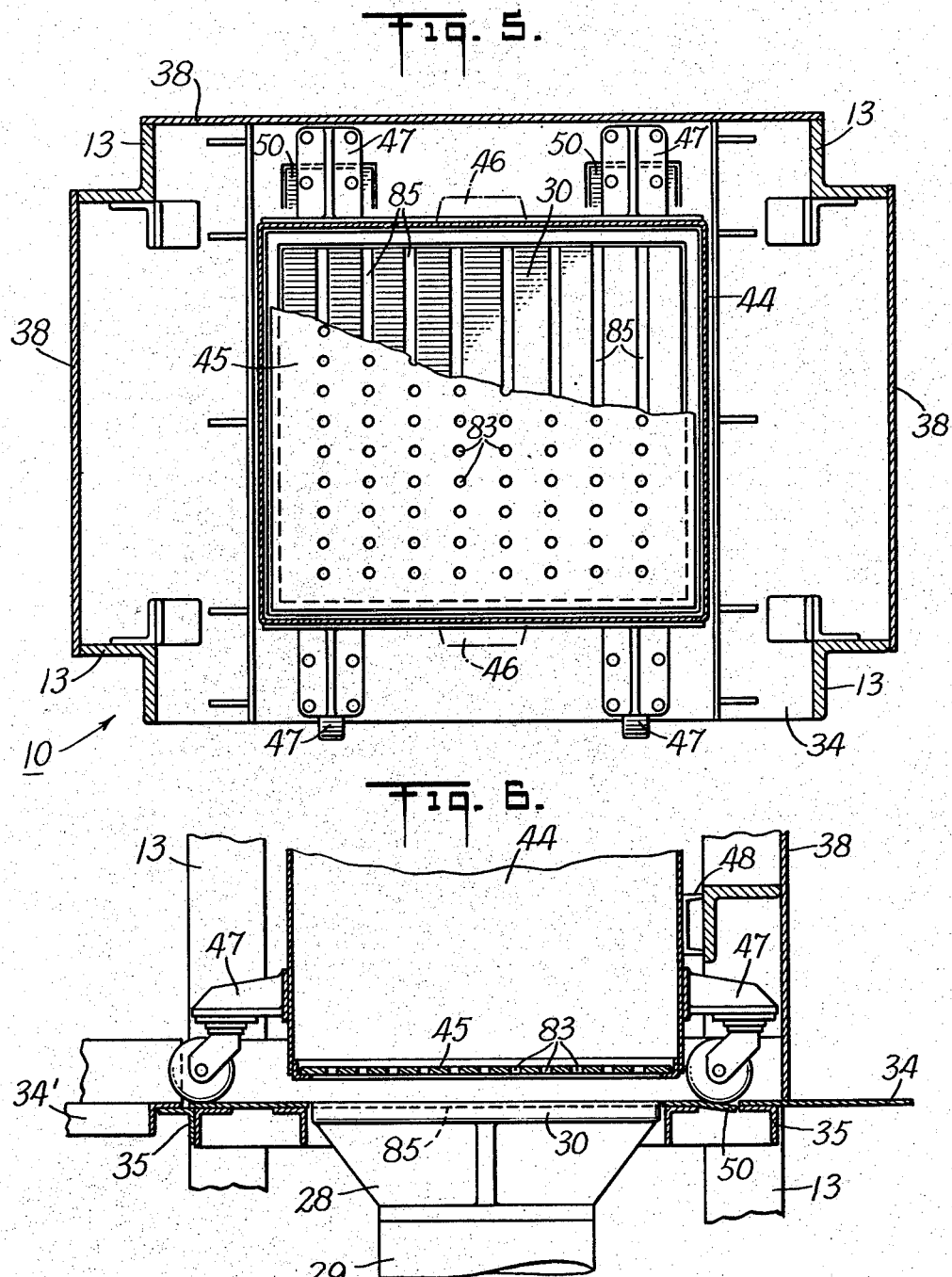

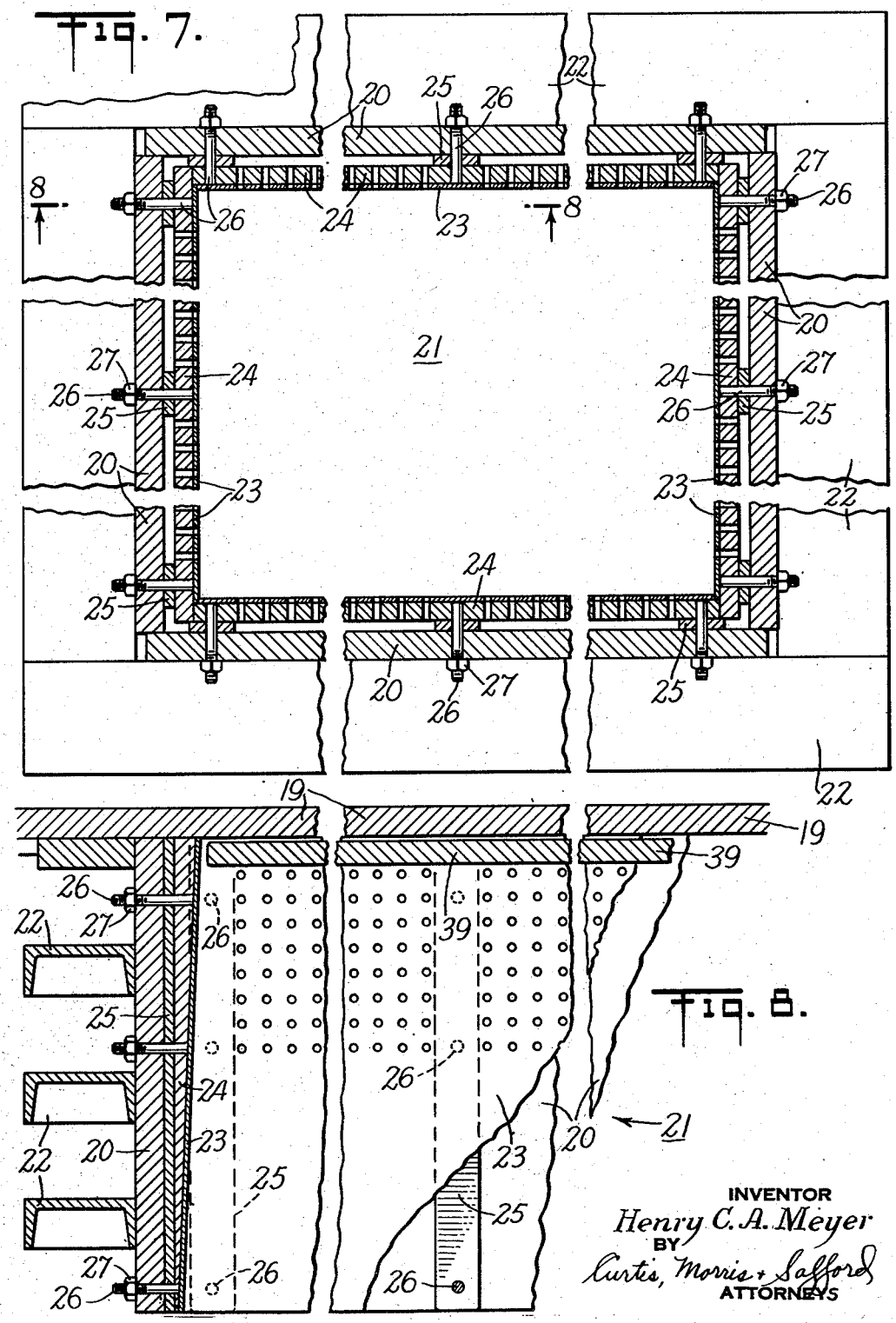

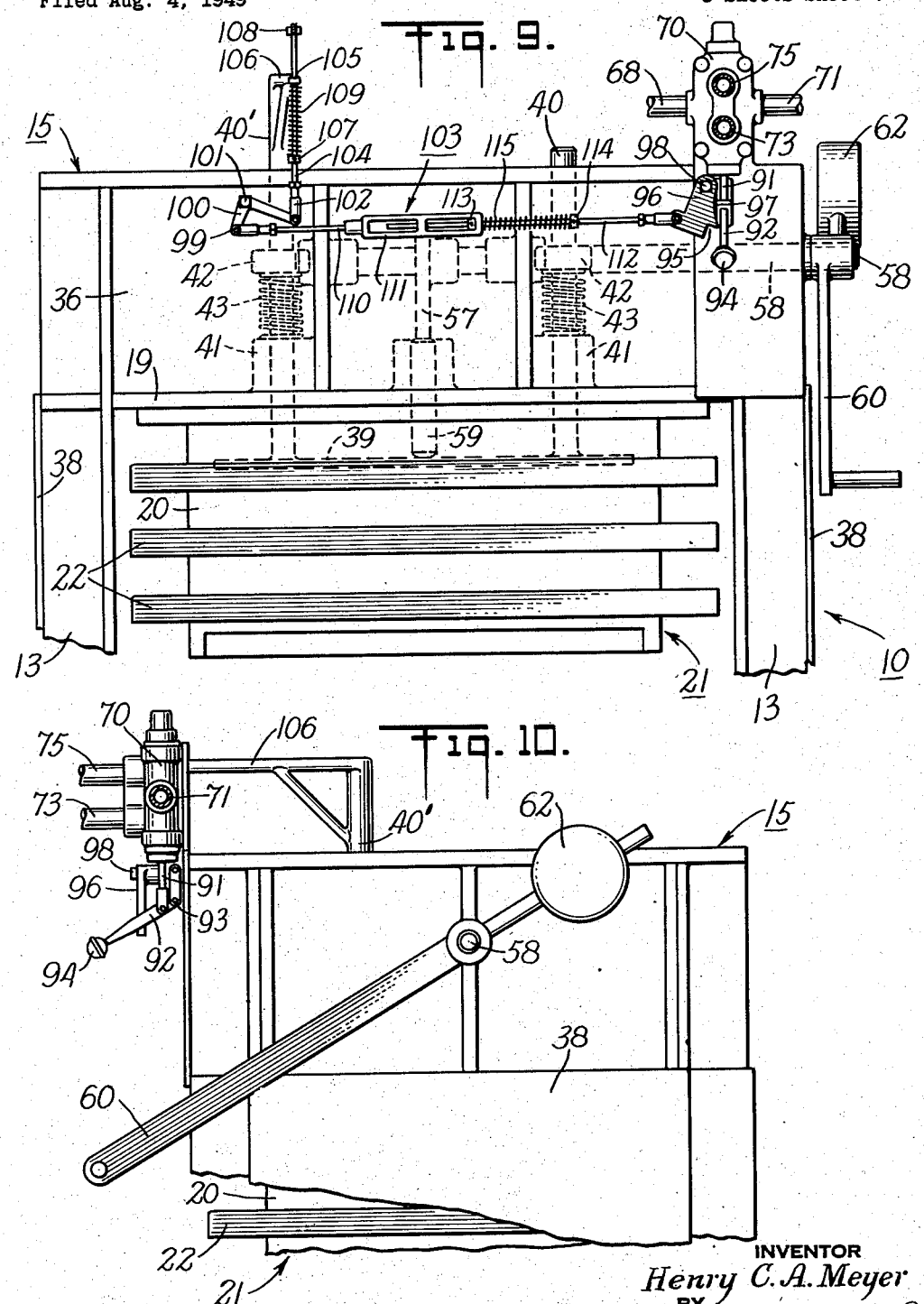

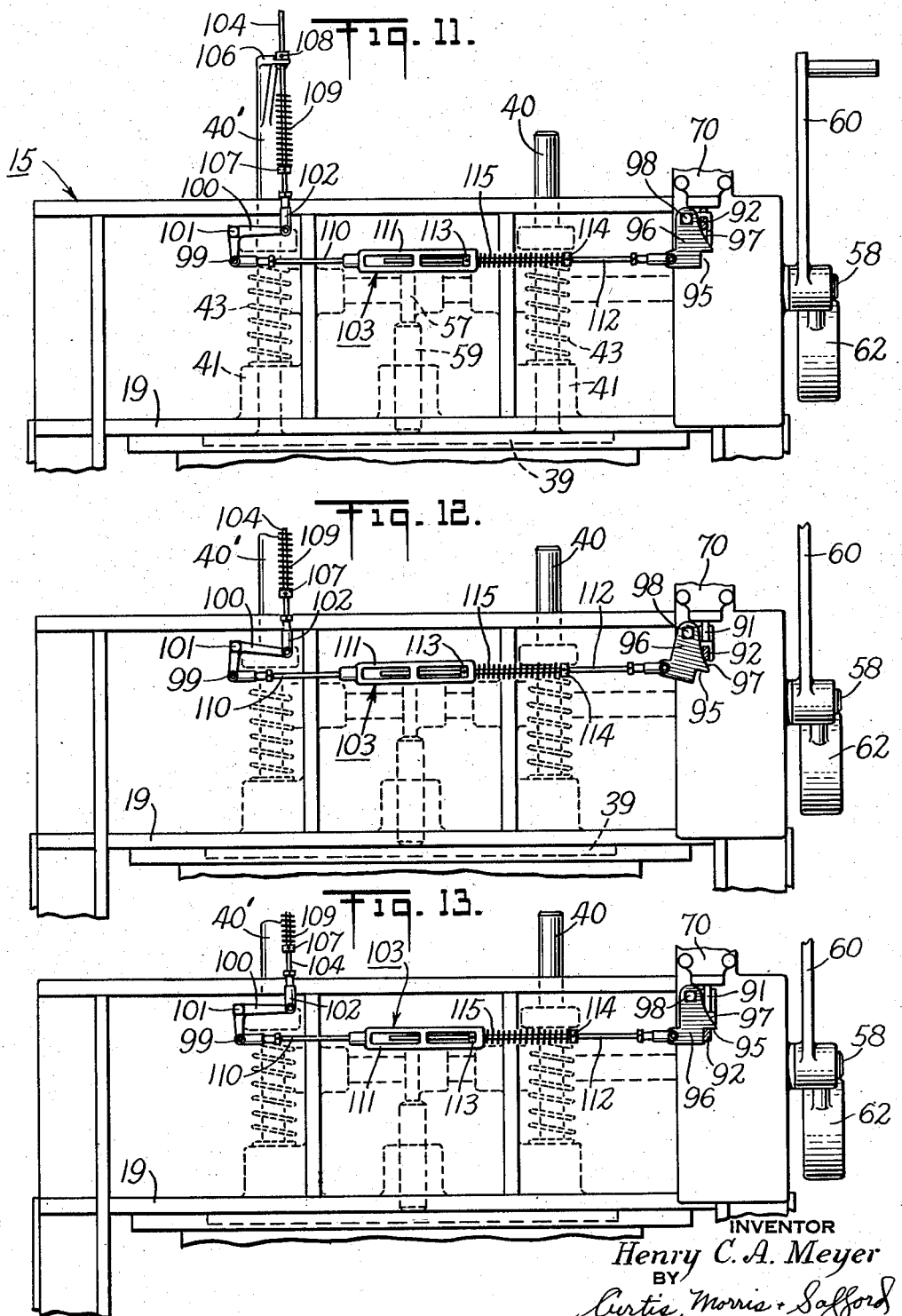

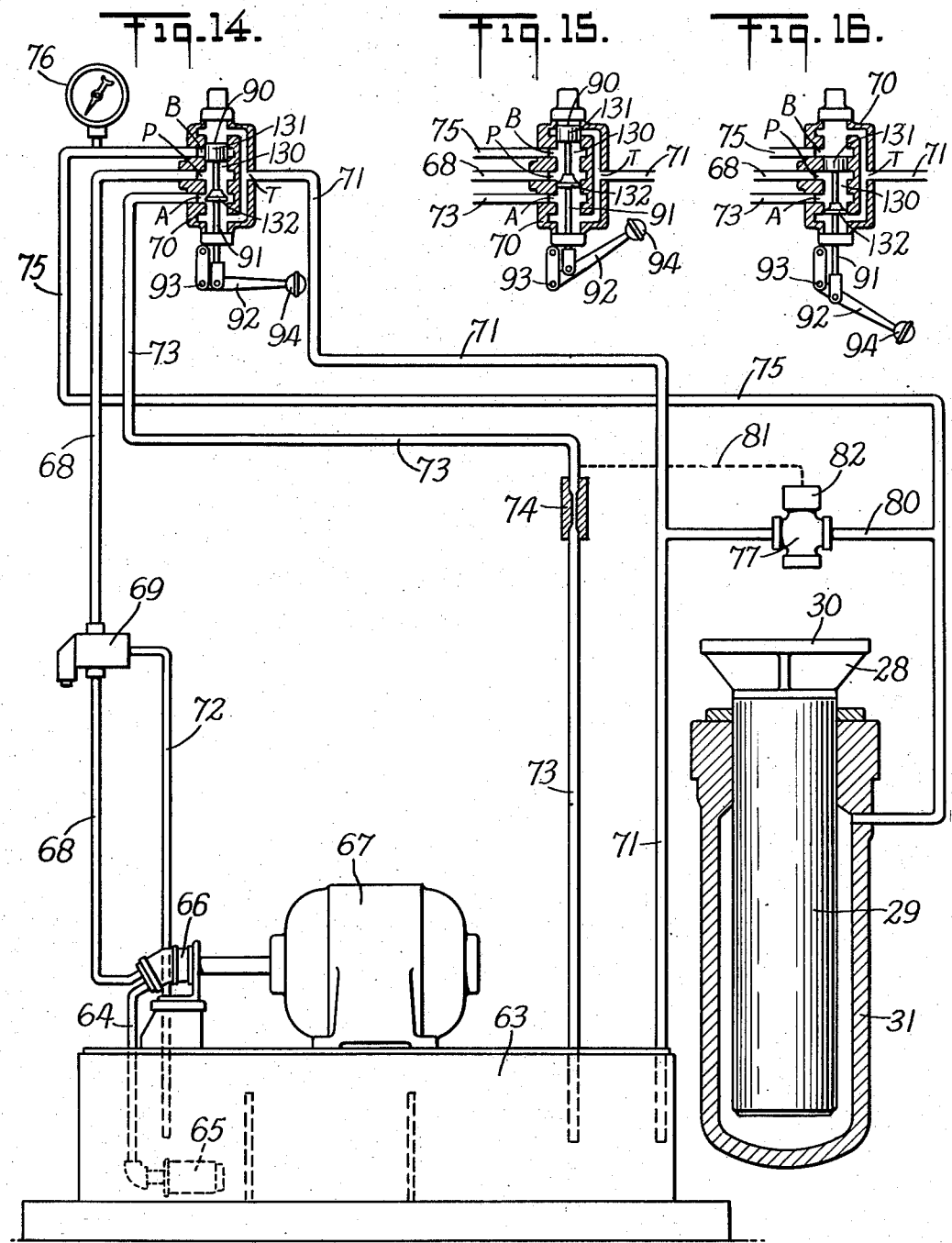

2,711,642

LIQUID EXTRACTOR

Henry C. A. Meyer, Syracuse, N. Y., assignor to United States Hoffman Machinery Corporation, New York, N. Y., a corporation of Delaware Application August 4, 1949, Serial No. 108,567

1 Claim. (Cl. 68—241)

This invention relates to liquid extractors and more particularly to water extractors designed for use in laundries, towel and rag cleaning establishments and the like.

In accordance with the present invention the extractor comprises an upper pressure chamber beneath which may be placed a laundry receptacle having a loose bottom capable of being lifted by the head of a vertically acting hydraulic press, with the contents of the receptacle, into the said pressure chamber to squeeze the said contents against the top plate of the pressure chamber, which thus constitutes the bedplate of the press. The invention comprehends special devices for delivering the pressed load downwardly out of the pressure chamber upon any suitable receiving surface placed within the confines of the press for that purpose.

An object of the invention is to provide a simple and rugged extractor press for rapidly and efficiently squeezing the water from a load of wet goods.

Another object is the provision of improved means to facilitate and control the removal of the load from the extractor after sufficient water removal.

Another object is to provide certain devices interlocking with the operating mechanism of the press for ensuring safety of operation in a correct manner.

With the foregoing and other objects in view, which will appear as the description proceeds, the invention resides in the combinations and arrangement of parts and in the details of construction hereinafter described and claimed, it being understood that changes in the precise embodiment of the invention herein disclosed may be made within the scope of what is claimed without departing from the spirit of the invention.

The invention is illustrated in the accompanying drawings, wherein:

Fig. 1 is a front elevation showing the press as installed in a pit, the walls of the latter being disclosed in cross section with the press plunger in its lowered position;

Fig. 2 is a side elevation of same with the side plate removed, a wet goods basket being shown in operative relation thereto and a mobile goods receiving platform indicated in dotted lines in its receiving position;

Fig. 3 is a top plan view of the press installation;

Fig. 4 is an enlarged vertical cross section taken on line 4—4 of Fig. 1, showing the receiving platform in receiving position and the operated positions of certain other parts indicated by dotted lines;

Fig. 5 is an enlarged, horizontal cross section on line 5—5 of Fig. 1 but showing the wet goods basket in part in top plan and in part with a portion of the removable basket bottom broken away to give a top plan view of the head plate or bolster of the press;

Fig. 6 is an enlarged vertical partial cross section on line 6—6 of Fig. 1;

Fig. 7 is an enlarged horizontal cross section on line 7—7 of Fig. 1 showing the construction of the extractor pressure chamber;

Fig. 8 is a section taken on line 8—8 of Fig. 7 with parts broken away;

Fig. 9 is an enlarged front elevation of the upper part of the press showing details of a safety device and interlock;

Fig. 10 is a similar right side elevation and

Figs. 11, 12 and 13 are similar views of the portion of the press shown in Fig. 9 but with the control devices and interlocking parts in different operative positions;

Fig. 14 is a diagrammatic view of the extractor hydraulic circuit showing the control valve in neutral position and the valve casing in vertical section;

Figs. 15 and 16 are sectional views of the control valve casing with the valve in up or press operative position and down or press release position respectively.

The extractor shown herein is designed to operate in combination with a wet goods basket for liquid extraction in a manner generally similar to the extractor press disclosed in the patent application of Meyers M. Berger, Ser. No. 587,961, now Patent No. 2,586,292, granted February 19, 1952.

By referring to the present drawings and Figures 1 and 2 in particular, it will be seen that the extractor consists of a vertically positioned box-like frame 10, the lower portion of which is seated in a pit 11 so that the approximate mid-section of the extractor lies at ground or floor level 12. The four-sided rectangular frame 10 is preferably formed of suitable vertical structural steel angle members 13 at its four corners, a base structure 14 to the lower flange of which the lower ends of the angles 13 are secured, as by welding, and a top structure 15 similarly attached to the upper ends of the angles 13.

The bottom plate 16 of the base is supported upon the walls 17 of a lower portion of the pit 11, and is fastened thereto by bolts and nuts 18. A plate 19, at the bottom of the top structure 15, forms the pressure receiving bed of the extractor.

Beneath the bedplate 19 there is supported a rectangular pressure chamber 21 which, see Fig. 7, comprises four side plates 20, secured to the plate 19. These plates are welded, or otherwise fastened, on the four sides of the press, to horizontal channel members 22, which are fastened together at the four corners of the structure and form outside support to resist the pressure to which the interior of the pressure chamber may be submitted.

The interior surfaces of the pressure chamber comprise perforated liner plates 23 which are held in a downwardly and outwardly flared relation to the vertical center line of the chamber, see Figs. 7 and 8, by means of downwardly tapered spacer plates 24. This outward flare of the sides provides slight draught to facilitate the ready removal of the squeezed load. Spacers 24 are perforated like the liners 23 and are held in spaced relation to the outside plates 20 by means of vertical spacer bars 25. Bolts 26 welded to the liners 23 pass through registering openings in plates 20 and 24 and bars 25. All of the interior parts of the pressure chamber are thus held in place by the bolts 26 and nuts 27. It will be noted, see Fig. 4, that the front side of the pressure chamber is vertically shorter than the other three sides thereof. This permits the passage of a wet goods basket beneath the front wall, to a position contained within the walls of the said chamber and above the press head 28.

The hydraulic press comprises, among other parts, the plunger 29, the head 28, the headplate 30 and the hydraulic cylinder 31. The latter is supported, as shown in Figs. 1 and 4, by the base structure 14.

A drain pipe 32, Fig. 1, is disposed at the bottom of a sump 33 formed within the pit 11 to lead off water which falls into the pit when extracted by the press. The floor around the press comprises a plurality of floor plates 34 and a grill 34' which rest upon the concrete walls of the pit and upon various angle iron supports 35 forming part of the main frame.

The four sides of the top and base structures comprise on the four sides reinforced vertical plates 36 and 37 respectively, welded to each other and to the contiguous parts of the frame.

Between the floor and the top structure 15 the exterior of the main frame is covered on its two lateral sides and its back by relatively thin plates 38 which are bolted or otherwise removably secured to the vertical corner angles 13 or other contiguous parts of the frame.

A plate 39 for ejecting liquid extracted goods is disposed within the pressure chamber 21 and is mounted to reciprocate up and down in said chamber at the lower ends of vertical guide rods 40 and 40' to which it is fastened. The rods 40—40' pass through bearings 41 on the frame and extend upwardly above the top of the press. Collars 42 carried near the upper ends of the rods 40, 40' prevent the plate 39 from descending below the lower edge of the pressure chamber. Springs 43 may be placed between the bearings 31 and the collars 42 normally to hold and return the ejector plate in and to its upper position, as shown in Fig. 4.

The open front of the structure provides for positioning a rectangular wet goods basket 44 in operative position in the extractor. The basket is provided with an upwardly movable bottom 45, perforated as shown in Figs. 5 and 6, and is also provided front and rear with handles 46 by which it may be moved. The basket is mounted on wheeled castors 47 and has a rear abutment member 48 which when the basket is in position above the head of the press, Fig. 6, abuts against the rear of the frame. It will be noted that in this position the rear wheels of the basket rest upon a rearwardly declining surface 50 formed in a floor plate 34. This arrangement aids in placing the basket in proper position and prevents unwanted movement of the basket in a forward direction. Angle iron abutments 51, see Fig. 1, secured upon the sides of the basket, near its top, prevent its being lifted into the pressure chamber during upward movement of the press plunger.

In Fig. 4 and in dotted lines in Fig. 2 there is shown positioned beneath the pressure chamber, in place of the basket 44, a hand truck or table 53 comprising a flat table top 54, castors 55 and a handle bar 56. The latter part facilitates moving the table from one place to another in the laundry and into place within the press. The table frame is provided with an abutment member 56' similar to the rear abutment member 48 of the basket.

Referring to Fig. 4, a cam 57 will be seen rigidly mounted upon a horizontal shaft 58 rotatably mounted in the top structure 15. This cam may be turned from the position shown in full lines to that shown in dotted lines, during which movement it depresses a pin 59, slidably mounted to extend between the cam and the ejector plate 39. Thus the plate is depressed to eject downwardly the squeezed material from the pressure chamber, as indicated in dotted lines in Fig. 4.

Ejection is effected by the operator by downward movement of a counterweighted handle 60, Fig. 1, rigidly mounted at the outer end of shaft 58, which projects beyond the right side of the press frame at a point convenient for manual operation. In the upper position of the handle the cam 57 is inactive. When turned down by downward pressure on the handle and the handle then released the parts return to the upper position because of the counterweight 62 on the handle 60 and the action of the springs 43.

Referring to Fig. 14 it will be understood that the plunger 29 of the hydraulic press is raised by a fluid, preferably oil, contained in a reservoir tank 63. A suction pipe 64 having a strainer 65 leads to a high pressure pump 66 which is driven by an electric motor 67, suitably connected to an electric power line through a control box and switch 49, Fig. 1. The discharge pipe 68 of the pump leads through a loaded pressure release valve 69 to the opening P of a four-way valve casing 70. The valve within the casing may be moved from a normal neutral position in which the pump is connected by means of openings P and T and a return pipe 71 directly with the reservoir 63. A pipe 72 leads any discharge from the pressure release valve 69 back to the tank also. A third pipe 73 leads from the lower opening A of the valve casing through a constricted passage in a member 74 back to the tank, as will be described later. A fourth pipe 75 equipped with a pressure gage 76 leads directly from an upper opening B of the valve casing to the cylinder 31 of the press. A pilot check valve 77 is mounted in a by-pass pipe 80 connecting pipes 71 and 75. A small pipe 81 connects the pressure chamber 82 of the pilot valve with the pipe 73 at a point above, or high pressure side of, the constriction member 74, as will be more fully described hereinafter. As pressure builds up in pipe 73, when the valve is in its lower or release position, above the constrictor 74, the pressure in pipe 81 becomes high enough to move the valve 77 to connect pipes 75 and 80 with pipe 71. Thus the return oil flow through pipe 71 becomes greater than that passing the constrictor in pipe 73. This gives a direct open by-pass return from cylinder to tank.

As stated above, the bottom board or plate 45 of the basket is loosely positioned in the basket 44 so that the laundry or other wet load may be elevated by the action of the hydraulic plunger 29. The board is perforated as indicated at 83 in Figs. 5 and 6 to permit the discharge of liquid therethrough. The face plate 30 of the press is provided with grooves 85 on its upper surface, see Figs. 5 and 6, for draining off said liquid into the sump 33.

When operating, the face plate of the plunger engages the bottom member 45 of the basket in such a manner as to lift it and the laundry thereon upwardly out of the basket and into the pressure chamber 21, where the laundry engages the ejector plate 39 backed up by the bed 19, hereinbefore described. Thus liquid in the load is forcibly extracted or squeezed out and the laundry compacted into a rectangular cake in the upper portion of the pressure chamber. After the press head has been restored to its lowered position, the compacted load will be held up by friction within the chamber and will not fall until, when the lever or handle 60 is drawn down, the cam 57 depresses pin 59 and plate 39, causing the load to drop downwardly out of the pressure chamber. The ejection is facilitated by the downwardly outward flare of the interior of the chamber.

When the press head returns to its lower or inoperative position the bottom member 45 of the basket follows the head down until it rests in normal position within the basket.

The four-way valve 90 within the housing 70 may preferably be a reciprocating spool type valve, as shown in Figs. 14, 15 and 16. The manner in which it connects and disconnects with the openings P, T, A and B of the valve housing will be later described. At present it is enough to say that the valve body reciprocates up and down with a valve stem 91 upon operation of valve handle 92 to which the rod is pivoted. When the handle is in the up position, Fig. 15, the cylinder is connected to the pump and the plunger will rise. When in hold or neutral position, Fig. 14, the cylinder will be cut off from the pump and also from the tank and pressure in the cylinder will continue to act upon goods in the press. At the same time the pump will be connected through the valve casing with the tank.

When in its lower or release position, Fig. 16, the pressure fluid will return from the cylinder to the tank. This complete operation involves certain unique features which will appear later.

The valve handle 92 is pivoted at 93 to the valve stem 91 and is provided at its end with a handgrip 94.

It will be noted by reference to Fig. 13 that when the valve handle 92 has been moved down to release position it is held in such position by the notched portion 95 of a cam faced latch member 96 having a cam surface 97 cooperative with the handle 92 and pivoted as at 98 to the frame of the press. This cam is pivotally connected to a resilient link, indicated generally as 103, the other end of which pivotally connects at 99 with a bell crank lever 100 pivoted at 101 to the press frame and at its other end pivoted to a clevis 102 disposed at the lower end of a rod 104. The latter extends upwardly at the front of the press frame and passes through an opening 105 formed in an arm 106 (Fig. 9) which is secured to and moves up and down with the movement of the ejector plate rod 40'. The rod 104 carries in fast relationship thereto a pair of spaced collars 107, 108 and a helical spring 109 is disposed between the lower collar 107 and the arm 106.

It will be remembered that the rods 40, 40' move downwardly when the ejector plate is actuated by downward motion of the handle 60 to cause ejection of the press cake of laundry material. When this occurs the arm 106 through reaction of spring 109 resiliently withdraws the latch member 96 into retracted position, whereat the valve handle 92 is free of the notch 95 and the valve handle may be moved into neutral or upper position in sliding contact with the cam face 97. The latch member 96, by means of its notch 95, thus provides an interlock which effectually prevents fluid operation of the press while and so long as the ejector lever 60 is held in manually operated position. This will be referred to again later in a description of the normal operation of the press. It will of course be obvious that upon release of the lever 60 the interlocking mechanism will return the latch member 96 to a position in which the cam surface 97 will make resilient contact with the side of the valve handle 92, which is immediately returned by the operator to its normal neutral position again to connect the pump via the unrestricted return pipe 71 to the oil tank.

It will be noted that the link 103 comprises a rod 110 tightly connected to a coupling 111 through the opposite end of which slides a rod 112 having a collar 113 within the coupling and a collar 114 between the coupling and the cam member 96. A spring 115 surrounding rod 112 and interposed between the coupling 111 and the collar 114 tends normally to hold the cam member to the right in contact with the lever 92, but will permit engagement of the cam surface 97 with the handle 92 to force the cam to the left, as will be understood by reference to Figs. 9, 11, 12 and 13.

The hydraulic valve as shown in the sectional detail views comprises the cylindrical valve chamber 130 within the casing 70 in which reciprocates the spool valve 90. The form of the valve and its relation to the valve passages A, B, P and T are clearly shown in the several positions of the valve shown in the drawings. It will suffice to say that in the up position, P connects via B directly with the cylinder and is cut off from valve ports A and T and return pipes 73 and 71.

In the hold position (Figure 14) P is cut off from the cylinder and is connected to the tank 63 by way of both pipes 71 and 73, as the shape of the land 132 of the valve permits restricted flow at slightly reduced pressure to ports A and T. Because of the constrictor 74 most of the pumped oil will return to the tank through pipe 71 and there will be insufficient pressure build-up in pipe 73 above the constrictor 74 to effect opening of the check valve 77 against the back pressure of the ram in pipe 75.

In the release position, P connects directly with A and 73 and B with T and 71. Thus during operation of the press with valve in hold position, oil from pump will enter valve 70 at P and pass via A and T via 71 and 73 to tank at somewhat reduced pressure. With valve in up position, oil will enter at P and leave at B causing ram of cylinder to rise and extract the clothes at full pressure. With valve in release position oil from pump will go from P to A and back to tank as stated above. Oil from cylinder via pipe 75 will flow from B to T and return to tank, also as pump pressure builds up through A in pipe 73 the check valve 77 because of by-pass 81 will open and oil from cylinder will also return via 80, 77 and 71 to tank. The opening of check valve 77 thus hastens the return of oil to the tank and so expedites the return action of the press ram.

In the general operation of the extractor the parts stand at the beginning substantially in the positions shown in Figs. 1 and 2. The basket 44, loaded with wet laundry, is wheeled into position as therein illustrated, with the stop member 48 engaged with the back of the frame and the rear wheels resting on the down bent section 50 of the floor plate 34. When thus securely positioned, the motor 67 is energized to effect operation of the pump 66, which thereby withdraws hydraulic fluid from the tank 63 by way of the piping 68, release valve 69 and control valve 70. At the beginning the valve 90 and valve handle 92 are in mid or neutral position as in Fig. 14 and the pumped fluid is returned to the tank. The operator now raises the valve admitting fluid to the cylinder 31 of the press. The ram 29 then rises and lifts the bottom 45 of the basket and therewith the wet laundry upwardly out of the basket and into forceful engagement with the ejector plate 39 and bedplate 19. This action continues until the wet laundry is wet-dried and compacted into a cake filling tightly the upper space in the pressure chamber. As the pressure in the chamber runs up into the neighborhood of 4000 lbs. per square inch very quickly, the operator has only to hold the valve in up or operating position for a brief interval during which most of the water in the goods is expressed. He thereupon returns the valve and handle to neutral or hold position for another brief period during which the pump is cut off from the press cylinder and the ram being held in its upper portion the pressure in the pressure chamber will be held long enough to finish the extraction of the laundry.

When satisfactory extraction has been attained, the valve is thrown to down or release position to connect the press cylinder with the tank, first via pipe 75 and pipe 71. Simultaneously fluid from the pump 66 passes from pipe 68 to pipe 73 and through restriction member 74 to the tank. When pressure is built up in pipe 73 behind the restriction member 74 the pilot valve 77, 82 opens to connect pipes 80 and 71, thus permitting the cylinder to exhaust directly into the tank without passing through the valve casing 70. The press head now returns to floor level position and the bottom board returns therewith to its seat within the bottom of the now empty basket, which during the whole operation has remained in its set position on the floor above the press cylinder. It will be understood that the engagement of the basket abutment angles 51 with the lower edge of the pressure chamber walls has prevented lifting of the basket during the up stroke of the press.

The empty basket may now be wheeled out of the press frame and the receiving table 53 be wheeled in to take its place.

To discharge the laundry from the press upon the receiving table it is now only necessary for the operator to pull down on the cam operating handle 60, whereupon the ejector plate descends and the press cake of extracted material falls upon the table and is then wheeled away for subsequent treatment.

At this point it may be well to recall that the pressure chamber walls flare outwardly from top to bottom, thus facilitating the discharge of the goods which have become so tightly compacted as generally to be incapable of falling by their own weight unless given a preliminary shove by the extractor plate.

After the goods have fallen upon the table, release of the handle 60 permits the ejector plate to return to its upper position. The valve 70 is then returned to its neutral position.

As many possible embodiments may be made of the above invention and as many changes might be made in the embodiments set forth above without departing from the scope thereof, it is to be understood that all matter hereinbefore set forth or shown in the accompanying drawings is to be interpreted as illustrative only and not in a limiting sense.

I claim:

In a hydraulic laundry extractor, in combination, an upper pressure chamber, a vertical ram movable upwardly into said chamber to compress goods within the upper portion of said chamber, a goods ejector plate movable downwardly within said chamber and having a manual device for effecting its operation, a fluid pressure supply for operating said ram, a control valve for said fluid settable by hand to a ram operating position, a ram holding position or a ram releasing position, a latch provided automatically to lock said valve in its said release position, and means resiliently associated with said ejector plate and said latch to effect release of said valve from its locked release condition upon movement of said manual device to its initial unoperated position.

References Cited in the file of this patent

UNITED STATES PATENTS

| | | | |
|---|---|---|---|
| 113,816 | Thompson | Apr. 18, | 1871 |
| 167,939 | Riesel | Sept. 21, | 1875 |
| 168,545 | Webber | Oct. 5, | 1875 |
| 315,529 | McGowan | Apr. 14, | 1885 |
| 320,541 | Crossley et al. | June 23, | 1885 |
| 588,938 | Albrecht | Aug. 31, | 1897 |
| 676,806 | Weber | June 18, | 1901 |
| 1,015,167 | Francis | Jan. 16, | 1912 |
| 1,150,574 | Bellows | Aug. 17, | 1915 |
| 1,169,559 | Muller | Jan. 25, | 1916 |
| 1,191,661 | Caldwell | July 18, | 1916 |
| 1,503,673 | Upton | Aug. 5, | 1924 |
| 1,710,698 | Green | Apr. 30, | 1929 |
| 2,219,709 | Lee | Oct. 29, | 1940 |
| 2,586,292 | Berger | Feb. 19, | 1952 |

FOREIGN PATENTS

| | | | |
|---|---|---|---|
| 37,096 | Austria | Apr. 26, | 1909 |
| 622,285 | Great Britain | Apr. 29, | 1949 |
| 661,782 | France | Mar. 11, | 1929 |